June 27, 1944.     G. GILBERT     2,352,315
LUBRICATING OIL FILTER FOR AIRPLANE ENGINES
Filed Dec. 24, 1942
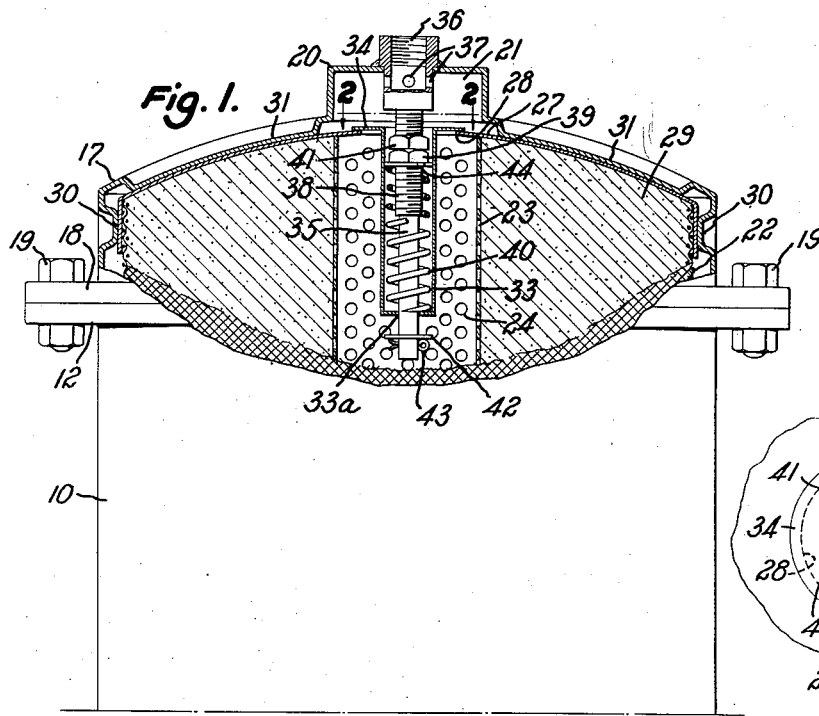
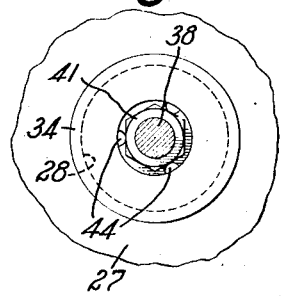
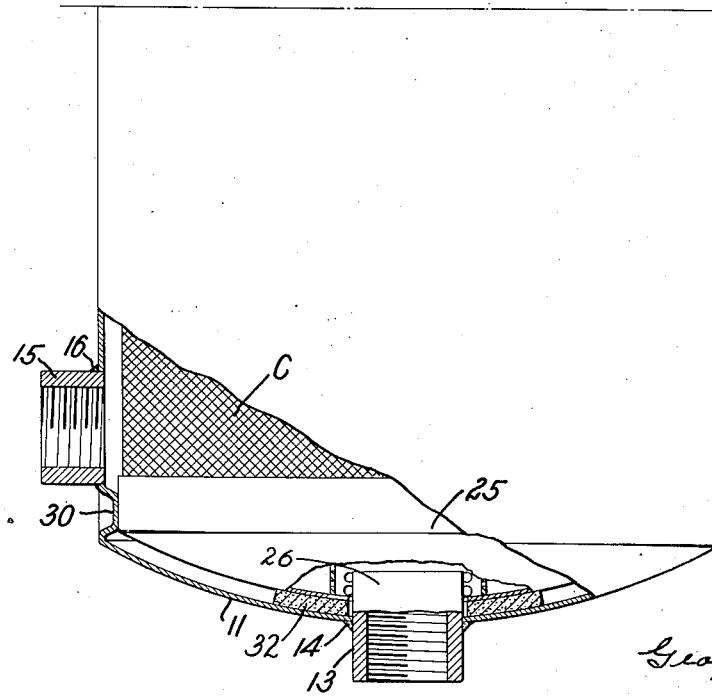
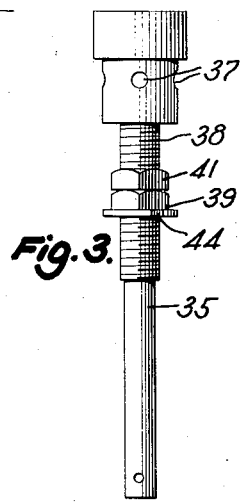
Inventor
Geoffrey Gilbert,
By Pierce & Scheffler
his Attorneys.

Patented June 27, 1944

2,352,315

UNITED STATES PATENT OFFICE 2,352,315

LUBRICATING OIL FILTER FOR AIRPLANE ENGINES

Geoffrey Gilbert, Plainfield, N. J., assignor to Gilbert Process Corporation, Plainfield, N. J., a corporation of Delaware Application December 24, 1942, Serial No. 470,063

10 Claims. (Cl. 210—131)

This invention relates to the provision of an improved lubricating oil filter for airplane, and other, engines, and is concerned particularly with an airplane lubricating oil filter having a novel relief valve incorporated therein. While the filter is particularly adapted for use in connection with airplane engines, it may be used in other relations, e. g., in connection with automobile and other internal combustion engines.

An object of the present invention is the provision of a lubricating oil filter for use in the pressure oil system of an airplane (or other internal combustion) engine which filter shall be as simple, light weight and compact as possible. Another object of the invention is the provision of an improved relief valve for such a filter which valve may be incorporated thereinto or may be an integral part thereof. Other inventive objects will be apparent from a consideration of the following description.

The improved filter of the present invention comprises, in combination, a container having suitable inlet and outlet openings, a removable cover for the container, a cooperating filter cartridge, and a relief valve secured to the container cover and adapted to be disposed,—when the components of the combination are in place for use,—generally within an open space provided in, and to cooperate with, said filter cartridge. The filter preferably is designed for flow of the oil from a generally central open (inlet) space in the filter cartridge radially outwardly through an oil-permeable filtering medium contained in said cartridge and into an open (outlet) space between the cartridge and the container wall, and the relief valve is positioned generally within said central open (inlet) space in said cartridge so as to be actuatable by excessive oil pressure set up in said inlet space for by-passing oil from said inlet space to said outlet space. The filter-relief valve combination may, and preferably does, include also means for leading off air (or air-filled oil bubbles) from beneath the cover of the container to an enclosed space for the reception of filtered oil. Such venting means makes possible the elimination of air from the oil stream passing to the oil cooler in systems wherein filtered oil passes from the filter to a cooler and thence to an oil reservoir.

The novel relief valve includes, in combination, a valve retainer rigidly secured at or near the outer end thereof to the inside of the container cover, the inner end of the valve retainer extending into the central open inlet space within the filter cartridge, a cup-like valve member, carried on and guided by said retainer and generally positioned within said inlet space, adapted to seat upon the adjacent end of the cartridge and to be movable axially outwardly of the cartridge into a space between the end of the cartridge and the central portion of the container cover, and means for biasing said valve into engagement with its seat on said cartridge. Preferably the valve-biasing means includes a compression spring and means for regulating the compression normally imposed upon the spring and hence for determining the critical opening pressure of the valve.

The invention will now be described in greater particularity with reference to a preferred embodiment of the invention illustrated in the appended drawing, in which Fig. 1 is a view illustrating the invention, with parts broken away to show the construction of essential elements of the article;

Fig. 2 is an enlarged fragmentary sectional elevation taken on line 2—2 of Fig. 1; and Fig. 3 is an enlarged side elevation of the valve guide and retainer shown in Fig. 1.

As illustrated in the drawing, the container 10 is a generally cylindrical vessel whose bottom 11 may be (as is shown) generally outwardly dished and whose open top terminates in a radially outwardly extending flange 12. The container is provided with a centrally disposed inlet as illustrated by the interiorly threaded nipple 13 secured within a suitable opening 14 in the bottom of the container, and with an outlet intermediate the top and bottom, and preferably adjacent the bottom, thereof, as illustrated by the interiorly threaded nipple 15 secured within a suitable opening 16 in the cylindrical wall of the container. 17 is a removable cover for container 10; its open bottom terminates in a radially outwardly extending flange 18 adapted to cooperate with flange 12 for closing the filter by suitable bolts 19, 19. The top of cover 17 may be and preferably is outwardly dished and provided with a centrally located outwardly extending dome 20 to provide an open space 21 under the cover to accommodate an air-venting means and the relief valve.

The filter cartridge unitarily referred to by character C, includes a foraminous peripheral wall 22, a foraminous core wall 23 defining a centrally disposed open core space 24 whose major axis is substantially coincident to the major axis of the filter cartridge, a bottom 25 which is imperforate save for a centrally disposed orifice 26 which is defined by one end of the core and which is adapted to cooperate with the centrally disposed inlet nipple 13 in the bottom of the container to lead lubricating oil under pressure into said core space, and a top 27 which is imperforate save for a centrally disposed orifice 28 providing communication with the opposite end of the core and not larger than said core space (cross section). The space between the foraminous peripheral wall and the foraminous core wall, and the imperforate top and bottom is filled with a suitable oil-permeable filtering medium 29. The periphery 22 of the filter cartridge is spaced from the side walls of container 10 sufficiently to provide between the two an outlet space the volume of which is sufficiently large to avoid back pressure and may be as large as that of the open core space 24.

Preferably the container and its cooperating cover are provided with a plurality of internal lugs 30, 30, or their functional equivalents, for centering the filter cartridge therein and for holding the filter cartridge against movement. On the inner surface of the top of the container cover there preferably are provided a plurality of inwardly extending radial ribs 31, 31, or functional equivalents thereof adapted (when the cover is fixed to the container) to contact the top of the filter cartridge C along a plurality of radial lines and to press said cartridge C against a yieldable annular washer 32 disposed in the bottom 11 of the container 10. These radial ribs serve positively to space the top of the filter cartridge from said cover, to provide channels for passage of air and for passage of oil when the relief valve is open.

The relief valve includes, in its preferred form, a cuplike valve member 33 having at its outer end an off-standing relatively broad flange 34 furnishing a valve head which seats in overlapping annular arrangement upon the adjacent end cap of the filter cartridge C in a manner to be described more particularly hereinafter. This cuplike member is carried by and guided upon a retainer 35 passing through the dome 20 of the cover and appropriately secured thereto, as for example by welding (as shown). The outer end of retainer 35 is counter-bored to provide a screw-threaded or other connection 36 for an outlet pipe (not shown) communicating between the dome 20 and the oil reservoir.

Access between the dome and the counterbore is furnished by a plurality of radially arranged openings 37, 37, in the outer end of retainer 35. Retainer 35 is substantially longer than the cuplike valve member 33, and its inner end passes through an aperture 33a, in the bottom of member 33, with a sliding fit, thereby providing a guide for the inner or lower end of the valve member. The inward extension of retainer 35 is screw-threaded throughout an intermediate portion 38 of its length to receive a flanged nut 39 between which and the closed end of the cuplike valve member 33 is confined a compression spring 40. The pressure on spring 40 may be regulated by appropriate adjustment of the flanged nut 39 and this adjustment may be fixed by means of a jam or lock nut 41. It will be understood that the opening pressure of the valve is determined by the normal compression imposed upon the spring.

The flanged nut 39 may and preferably does have such a diameter as to make a sliding fit within member 33, thereby to function also as the upper guide for the latter: the flange of nut 39 may be provided with one or more peripheral grooves or scallops 44 permitting free movement of fluid in the internal chamber of the valve member past said adjustment nut.

As will be readily appreciated, the valve retainer and cuplike valve with the compression spring and adjusting and locking nuts may (when the filter cover, with its appendages, is removed from the filter) be assembled as a unit, escape of the valve member from the retainer (under influence of the spring) being prevented by use of a washer 42 and cotter pin 43 or equivalent means applied to the inner end of retainer 35.

The outwardly extending flange 34 at the mouth of the valve member 33 is given such dimensions that it overlaps the surface of the cartridge top, immediately adjacent the upper end of the core wall by a predetermined amount, for the purpose of providing a predetermined substantial differential in the areas subjected to pressure (of the oil) when valve member 33 is in closed position and when it is in open position. By this measure, "chattering" of the valve (that is to say, the rapid repetition of opening and closing of the valve at the critical valve-opening setting) is avoided.

This avoidance of "chattering" by the provision of a differential in the "closed" and "open" areas of the valve subjected to oil pressure may be explained as follows: When the spring aforesaid is set to open at, say, 10 pounds pressure, no oil passes through the valve until that pressure is reached—save for a minor amount of seepage between retainer 35 and opening 33a in the bottom of the valve member. At 10 pounds pressure the oil begins to raise the cup, and hence the latter's flange begins to lift from the top of the cartridge so that oil begins to pass through the valve and over the top of cartridge C into the outlet space of the filter. When the valve is open, the area thereof subjected to pressure is the total area of the flange plus that of the base of the valve cup, whereas when the valve is closed the area subjected to pressure is diminished (from the above) by the overlap area of the flange. By reason of this differential, it comes to pass that as soon as the valve opens a larger area of its surface becomes subject to the oil pressure; consequently, the valve will not close until the oil pressure falls substantially below the critical 10 pounds opening pressure.

This "lag" differential, which eliminates "chattering," may be made as large or as small as desired, by appropriate enlargement or diminution of the overlap area of the flange. In a particular case, a lag of about 0.5 pound was found to be desirable; in this instance the overlap of the flange was $\frac{1}{32}''$. The resulting differential in areas might indicate a much greater lag than 0.5 pound unless it was appreciated that when the valve is fully open (under, say, a pressure of 11 pounds), the oil pressure on the outer $\frac{1}{32}''$ of the valve flange is a diminishing one—from 11 pounds to zero.

It is to be understood that the filter above described is to be interposed in the lubricating oil line of an internal combustion engine, the inlet nipple 13 being connected to a conduit (not shown) delivering oil to be filtered and outlet nipple 15 being connected to a conduit (not shown) communicating between the outlet space of the filter and the filtered oil receiver and/or cooler of the system.

The operation of the device will be apparent from the above description thereof. Impure oil delivered into central core space 24 normally flows radially outwardly through the filtering medium contained in cartridge C and into the annular outlet space between the periphery of the filter cartridge and the container wall and thence out of the filter by way of outlet 16. When, for any reason (e. g., low temperature of the oil at take-off), the pressure of the oil within core space 24 exceeds the critical opening pressure of the relief valve, valve member 33 is forced to rise from its seat on the cartridge cap, and oil flows from core space 24 along channels between radial ribs 31 and thence into the aforesaid annular outlet space. A reduction in the oil pressure to a value substantially below the critical opening pressure of the relief valve permits the compression spring to re-seat the valve and hence to confine the flow of the oil to passage through the filtering medium within cartridge C. Simultaneously, by means of the ports 37, vent 38 and suitable conduit the pressure of air within the filter is released and any emitted oil is returned to the oil reservoir.

The particular oil-permeable filtering medium to be contained in the filter cartridge is a matter of choice: it may and preferably does comprise a compacted mass composed of a multitude of promiscuously disposed resilient vermiform bodies of loosely associated cellulosic fibers said masses containing an adsorbent inorganic gel stiffening agent formed in situ in and among the fibers, as described and claimed in U. S. application Serial No. 375,998, filed January 25, 1941, for "Filter unit, and process of making same."

As will be understood, either or both of the inner and outer walls of the filter cartridge may be formed of wire mesh or other reticulated material or foraminous metal sheet. The valve retainer may be secured to the filter cover by some other appropriate means than welding (as shown), and the filter cover dome may have any desired configuration consistent with the provision thereby of an open space into which the valve member can move and from which air can be vented. Any suitable pressure-responsive means for determining the critical opening pressure of the valve member may be substituted for the particular spring means specifically described and illustrated.

It is to be understood that the filter cartridge and filter casing might be flat, instead of domed, top and/or bottom. Whether the top of the filter cartridge be flat or generally domed, it is desirable that that portion of the cartridge top on which the valve flange seats be complementary to the configuration of that portion of said flange which seats upon it, in order that good seating engagement be had. Where seating engagement is less than perfect, I have found it possible to perfect the seating by the interposition of a gasket, e. g., a gasket of neoprene, which is resilient and which is not affected by hot oil.

With regard to the above-described venting means, it may be noted that a foaming condition of the oil is not infrequently encountered in systems such as those in use in aircraft engines, but is always undesirable. The filtering step effects a considerable separation of air from the oil, and the venting means permits the free emission of the so-separated air from the oil stream prior to passage of the oil to the oil cooler, thereby not only serving to dispose of the air but also to avoid introduction of air into the contents of the cooler. The vented air may, as described above, be led to the oil reservoir, which latter piece of apparatus customarily is ventilated: by this measure any oil entrained in the stream of vented air is returned to the system.

I claim:

1. A lubricating oil filter for the pressure lubricating oil systems of airplane and other internal combustion engines, comprising in combination a container and cooperating removable cover therefor; a filter cartridge containing oil-permeable filtering medium and having imperforate top and bottom, a perforated peripheral wall and a perforated core wall defining a central open core space therein, said filter cartridge being spaced from the wall of said container to provide an annular outlet space and likewise being spaced from said cover to provide a by-pass between said core space and said annular outlet space; an inlet means in said container for introducing oil to be filtered, under pressure, into said central open core space; an outlet means in said container for discharging oil from said annular outlet space; and a relief valve carried by said cover and disposed generally within said central open core space, said relief valve normally seating against the top of the filter cartridge whereby to close said by-pass and adapted to be unseated, so as to open said by-pass, under an abnormal pressure condition within said core space.

2. A lubricating oil filter for the pressure lubricating oil systems of airplane and other internal combustion engines, comprising in combination a container and cooperating removable cover therefor; a filter cartridge containing oil-permeable filtering medium and having imperforate top and bottom, a perforated peripheral wall and a perforated core wall defining a central open core space therein, said filter cartridge being spaced from the wall of said container to provide an annular outlet space and likewise being spaced from said cover to provide a by-pass between said core space and said annular outlet space; an inlet means in said container for introducing oil to be filtered, under pressure, into said central open core space; an outlet means in said container for discharging oil from said annular outlet space; and a relief valve carried by said cover and disposed generally within said central open core space, said relief valve normally seating against the top of the filter cartridge whereby to close said by-pass and adapted to be moved axially outwardly from said central open core space toward said cover, whereby to open said by-pass, under an abnormal pressure condition within said core space.

3. A lubricating oil filter for the pressure lubricating oil systems of airplane and other internal combustion engines, comprising in combination a container and cooperating removable cover therefor; a filter cartridge containing oil-permeable filtering medium and having imperforate top and bottom, a perforated peripheral wall and a perforated core wall defining a central open core space therein, said filter cartridge being spaced from the wall of said container to provide an annular outlet space and likewise being spaced from said cover to provide a by-pass between said core space and said annular outlet space; an inlet means in said container for introducing oil to be filtered, under pressure, into said central open core space; an outlet means in said container for discharging oil from said annular outlet space; and a relief valve carried by said cover and disposed generally within said central open core space, said relief valve normally seating against the top of the filter cartridge whereby to close said by-pass and adapted to be unseated, so as to open said by-pass, upon the creation within said core space of a pressure in excess of a predetermined value.

4. A lubricating oil filter for the pressure lubricating oil systems of airplane and other internal combustion engines, comprising in combination a container and cooperating removable cover therefor; a filter cartridge containing oil-permeable filtering medium and having imperforate top and bottom, a perforated peripheral wall and a perforated core wall defining a central open core space therein, said filter cartridge being spaced from the wall of said container to provide an annular outlet space and likewise being spaced from said cover to provide a by-pass between said core space and said annular outlet space; an inlet means in said container for introducing oil to be filtered, under pressure, into said central open core space; an outlet means in said container for discharging oil from said annular outlet space; means for venting gas from said annular outlet space and by-pass; and a relief valve carried by said cover and disposed generally within said central open core space, said relief valve normally seating against the top of the filter cartridge whereby to close said by-pass and adapted to be unseated, so as to open said by-pass, under an abnormal pressure condition within said core space.

5. A lubricating oil filter for the pressure lubricating oil systems of airplane and other internal combustion engines, comprising in combination a container and cooperating removable cover therefor; a filter cartridge containing oil-permeable filtering medium and having imperforate top and bottom, a perforated peripheral wall and a perforated core wall defining a central open core space therein, said filter cartridge being spaced from the wall of said container to provide an annular outlet space and likewise being spaced from said cover to provide a by-pass between said core space and said annular outlet space; an inlet means in said container for introducing oil to be filtered, under pressure, into said central open core space; an outlet means in said container for discharging oil from said annular outlet space; and a relief valve carried by said cover and disposed generally within said central open core space, said relief valve including a cuplike valve member having at the top thereof an outwardly extending flange normally seating against the top of the filter cartridge and substantially overlapping on the top of the latter, said cuplike valve member being adapted to be moved axially outwardly from said central open core space toward said cover, whereby to open said by-pass, under an abnormal pressure condition within said core space.

6. A lubricating oil filter for the pressure lubricating oil systems of airplane and other internal combustion engines, comprising in combination a container and cooperating removable cover therefore; a filter cartridge containing oil-permeable filtering medium and having imperforate top and bottom, a perforated peripheral wall and a perforated core wall defining a central open core space therein, said filter cartridge being spaced from the wall of said container to provide an annular outlet space and likewise being spaced from said cover to provide a by-pass between said core space and said annular outlet space; an inlet means in said container for introducing oil to be filtered, under pressure, into said central open core space; an outlet means in said container for discharging oil from said annular outlet space; and a relief valve carried by said cover and disposed generally within said central open core space, said relief valve including a cuplike valve member having at the top thereof an outwardly extending flange normally seating against the top of the filter cartridge, regulatable means for biasing said valve member into seating engagement with the top of said cartridge, and means for guiding said valve member in axially outward movement of the latter from said central open core space toward said cover.

7. A lubricating oil filter for the pressure lubricating oil systems of airplane and other internal combustion engines, comprising in combination a container and cooperating removable cover therefore; a filter cartridge containing oil-permeable filtering medium and having imperforate top and bottom, a perforated peripheral wall and a perforated core wall defining a central open core space therein, said filter cartridge being spaced from the wall of said container to provide an annular outlet space and likewise being spaced from said cover to provide a by-pass between said core space and said annular outlet space; an inlet means in said container for introducing oil to be filtered, under pressure, into said central open core space; an outlet means in said container for discharging oil from said annular outlet space; a valve retainer fixed, near its outer end, to the removable cover and extending into said central open core space; a cuplike valve member carried on and guided by said retainer and generally positioned within said central open core space, said valve member being provided near the top thereof with an outwardly extending flange adapted normally to seat against and to overlap on the top of the filter cartridge; means for biasing said valve member into seating engagement with the top of said cartridge; and means within said cuplike valve member and carried by said retainer for regulating said biasing means.

8. A lubricating oil filter for the pressure lubricating oil systems of airplane and other internal combustion engines, comprising in combination a container and cooperating removable cover therefor; a filter cartridge containing oil-permeable filtering medium and having imperforate top and bottom, a perforated peripheral wall and a perforated core wall defining a central open core space therein, said filter cartridge being spaced from the wall of said container to provide an annular outlet space and likewise being spaced from said cover to provide a by-pass between said core space and said annular outlet space; an inlet means in said container for introducing oil to be filtered, under pressure, into said central open core space; an outlet means in said container for discharging oil from said annular outlet space; a valve retainer fixed, near its outer end, to the removable cover and extending into said central open core space; said retainer being provided near its outer end with at least one channel for venting gas from beneath said cover; a cuplike valve member carried on and guided by said retainer and generally positioned within said central open core space, said valve member being provided near the top thereof with an outwardly extending flange adapted normally to seat against and to overlap on the top of the filter cartridge; means for biasing said valve member into seating engagement with the top of said cartridge; and means within said cuplike valve member and carried by said retainer for regulating said biasing means.

9. A lubricating oil filter for the pressure lubricating oil systems of airplane and other internal combustion engines, comprising in combination a container and cooperating removable cover therefor; a filter cartridge containing oil-permeable filtering medium and having imperforate top and bottom, a perforated peripheral wall and a perforated core wall defining a central open core space therein, said filter cartridge being spaced from the wall of said container to provide an annular outlet space and likewise being spaced from said cover to provide a by-pass between said core space and said annular outlet space; an inlet means in said container for introducing oil to be filtered, under pressure, into said central open core space; an outlet means in said container for discharging oil from said annular outlet space; a valve retainer fixed, near its outer end, to the removable cover and extending into said central open core space, said retainer being provided near its outer end with at least one channel for venting gas from beneath said cover; a cuplike valve member carried on and having its inner end guided by said retainer and generally positioned within said central open core space, said valve member being provided near the top thereof with an outwardly extending flange adapted normally to seat against and to overlap on the top of the filter cartridge; means for biasing said valve member into seating engagement with the top of said cartridge; and means within said cuplike valve member and carried by said retainer for regulating said biasing means, said regulating means including a movable nut threaded on said retainer which movable nut has a sliding fit within said cuplike valve member and guides the outer end of the latter and is provided with at least one channel therethrough for passage of oil from one portion of said cuplike valve member to the other, whereby to prevent a braking action of oil contained in said cuplike valve member upon movement of the latter.

10. A lubricating oil filter for the pressure lubricating oil systems of airplane and other engines, comprising in combination a container and cooperating removable cover therefor; a filter cartridge containing oil-permeable filtering medium and having imperforate top and bottom, a perforated peripheral wall and a perforated core wall defining a central open core space therein, said filter cartridge being spaced from the wall of said container to provide an annular outlet space and likewise being spaced from said cover to provide a by-pass between said core space and said annular outlet space; an inlet means in said container for introducing oil to be filtered, under pressure, into said central open core space; an outlet means in said container for discharging oil from said annular outlet space; a gas-venting means in communication with said open outlet space and adapted at all times to vent gas from within said filter; and a relief valve carried by said cover and disposed generally within said central open core space, said relief valve normally seating against the top of the filter cartridge whereby to close said by-pass and adapted to be unseated, so as to open said by-pass, under an abnormal pressure condition within said core space.

GEOFFREY GILBERT.